US012401129B2

(12) United States Patent
Rodriguez-Garcia et al.

(10) Patent No.: US 12,401,129 B2
(45) Date of Patent: Aug. 26, 2025

(54) ANTENNA STRUCTURE

(71) Applicant: L3Harris Technologies, Inc., Melbourne, FL (US)

(72) Inventors: Pedro Rodriguez-Garcia, Heath, TX (US); Joshua Martin, Rockwall, TX (US); James Pierpont, Allen, TX (US); Robert George, Caddo Mills, TX (US); Philip Clayton Weatherly, Terrell, TX (US); Emily Marie Tobar, Rockwall, TX (US)

(73) Assignee: L3Harris Technologies, Inc., Melbourne, FL (US)

( * ) Notice: Subject to any disclaimer, the term of this patent is extended or adjusted under 35 U.S.C. 154(b) by 156 days.

(21) Appl. No.: 18/175,797

(22) Filed: Feb. 28, 2023

(65) Prior Publication Data

US 2024/0291157 A1 Aug. 29, 2024

(51) Int. Cl.

*H01Q 13/08* (2006.01)
*H01Q 1/48* (2006.01)
*H01Q 21/24* (2006.01)
*H01Q 21/06* (2006.01)

(52) U.S. Cl.

CPC ............. *H01Q 13/085* (2013.01); *H01Q 1/48* (2013.01); *H01Q 21/24* (2013.01); *H01Q 21/064* (2013.01)

(58) Field of Classification Search

CPC .... H01Q 13/085; H01Q 21/064; H01Q 21/24; H01Q 21/26

See application file for complete search history.

(56) References Cited

U.S. PATENT DOCUMENTS

| | | | | |
|---|---|---|---|---|
| 8,736,504 | B1 * | 5/2014 | West | H01Q 13/106 343/770 |
| 9,000,996 | B2 | 4/2015 | Holland et al. | |
| 9,455,500 | B1 | 9/2016 | West et al. | |
| 10,879,625 | B2 | 12/2020 | Kalfa et al. | |
| 11,158,951 | B2 | 10/2021 | Quintero | |
| 11,276,941 | B2 | 3/2022 | Kolitsidas et al. | |
| 11,342,683 | B2 | 5/2022 | Smith et al. | |
| 12,009,600 | B1 * | 6/2024 | Jensen | H01Q 21/26 |

(Continued)

OTHER PUBLICATIONS

S. Zhu, et al., “A Compact Gain-Enhanced Vivaldi Antenna Array With Suppressed Mutual Coupling for 5G mmWave Application”, IEEE Antennas and Wireless Propagation Letters, vol. 17, No. 5, May 2018, 4 pages.

(Continued)

*Primary Examiner* — Daniel Munoz

(74) *Attorney, Agent, or Firm* — Edell, Shapiro & Finnan, LLC

(57) ABSTRACT

In some aspects, the techniques described herein relate to an apparatus including: a ground plane element including: a non-conductive support layer, a conductive layer arranged on the non-conductive support layer, and at least one orifice through the non-conductive support layer and the conductive laminate layer; one or more radiating elements including a feed line and a solder pad, wherein each of the one or more radiating elements is secured to and electrically connected to the ground plane element via soldering of the solder pad to the conductive laminate layer; and at least one connector arranged in the at least one orifice and electrically connected to the feed line.

20 Claims, 15 Drawing Sheets

(56) References Cited

U.S. PATENT DOCUMENTS

| | | | | |
|---|---|---|---|---|
| 2006/0273974 | A1* | 12/2006 | Bij De Vaate | H01Q 21/24 343/770 |
| 2008/0211726 | A1* | 9/2008 | Elsallal | H01Q 13/08 343/770 |
| 2010/0117917 | A1 | 5/2010 | Kindt et al. | |
| 2020/0388927 | A1* | 12/2020 | Quintero | H01Q 1/38 |
| 2020/0395670 | A1* | 12/2020 | Mancewicz | H01Q 19/13 |

OTHER PUBLICATIONS

C. J. Hodgkinson, et al., "Compact UWB Antipodal Vivaldi Array for Beam Steering Applications", 2021 15th European Conference on Antennas and Propagation (EuCAP), Mar. 2021, 5 pages.

I. K. Phiri, et al., "An Antipodal Vivaldi Antenna Array with Modified Ground Plane and Slotted Radiators for 5G Millimeter-wave Applications", 2021 IEEE Indian Conference on Antennas and Propagation, Dec. 2021, 4 pages.

* cited by examiner

ANTENNA STRUCTURE

TECHNICAL FIELD

The present disclosure relates to techniques for constructing antennas, including Vivaldi antennas.

BACKGROUND

A Vivaldi antenna (sometimes referred to as a tapered slot antenna) is traditionally a co-planar broadband-antenna. Vivaldi antennas may be constructed by forming an open space in a solid piece of sheet metal, a printed circuit board, or from a dielectric plate metalized on one or both sides. From the open space area the energy reaches an exponentially tapered pattern via a symmetrical slot line. In an antipodal Vivaldi antenna, a first Vivaldi arm is formed on a first side of a dielectric plate material, and a second Vivaldi arm is formed on a second side of the dielectric plate material. The open space is formed in areas of the dielectric plate material not covered by either radiating element. Vivaldi antennas may be made for linear polarized waves through the use of a single open space radiator. Using two radiators perpendicularly arranged allows for Vivaldi antennas that receive both horizontally and vertically polarized signals. If the arrangement is also concentric, the two radiating elements may be fed with 90-degree phase-shifted signals to provide circular polarized electromagnetic waves.

Vivaldi antennas may be configured for almost any frequency range, as the Vivaldi structure is scalable in size. Printed circuit technology makes this type of antenna cost effective at microwave frequencies exceeding 1 GHz. Advantages of Vivaldi antennas may include their broadband characteristics, their ease of manufacturing, and their ease of impedance matching using microstrip line modeling methods. However, dual-polarized Vivaldi antennas generally include heavy mechanical support structures.

DETAILED DESCRIPTION

Overview

In some aspects, the techniques described herein relate to an apparatus including: a ground plane element including: a non-conductive support layer, a conductive layer arranged on the non-conductive support layer, and at least one orifice through the non-conductive support layer and the conductive layer; one or more radiating elements including a feed line and a solder pad, wherein each of the one or more radiating elements is secured to and electrically connected to the ground plane element via soldering of the solder pad to the conductive layer; and at least one connector arranged in the at least one orifice and electrically connected to the feed line.

In some aspects, the techniques described herein relate to an apparatus including: a ground plane element including: a non-conductive support layer, a conductive layer arranged on the non-conductive support layer, and a plurality of orifices through the non-conductive support layer, and the conductive layer; a plurality of antenna elements arranged on the ground plane element, wherein each of the plurality of antenna elements includes a feed line and a solder pad, and wherein each of the plurality of antenna elements is secured to and electrically connected to the ground plane element via soldering of its respective solder pad to the conductive layer; and a plurality of connectors, wherein each of the plurality of connectors is arranged in a respective one of the plurality of orifices and electrically connected to a respective one of the feed lines.

Example Embodiments

In accordance with discussion above, provided for herein are techniques for providing wideband, lightweight, and low cost antenna elements. The antenna elements constructed according to the disclosed techniques may provide wideband radio frequency (RF) performance and polarization diverse capabilities from a single, light-weight antenna.

Figure 2:
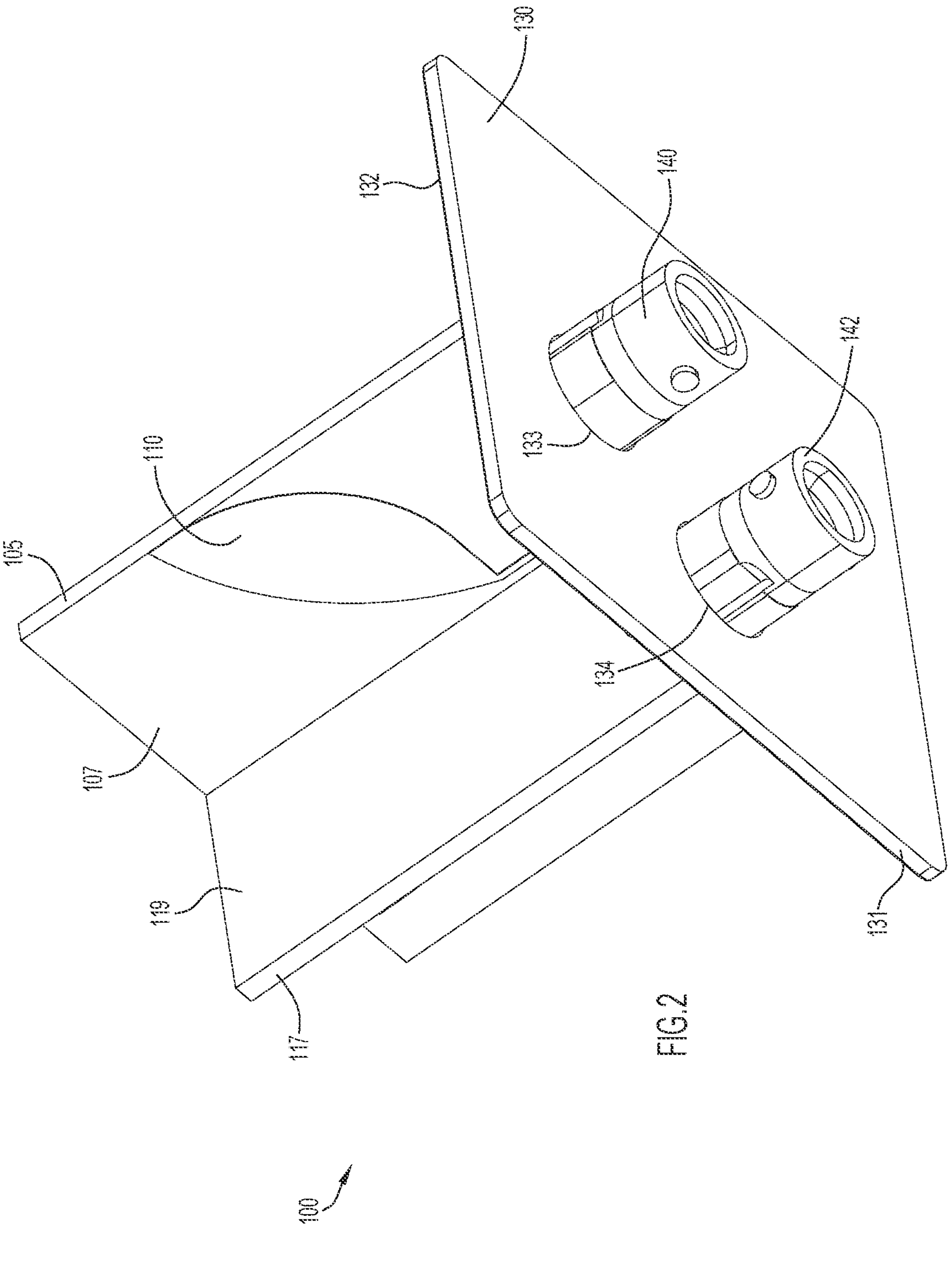
FIG. 2 is a second perspective view of an antenna element constructed according to the disclosed techniques, according to an example embodiment.
Figure 3:
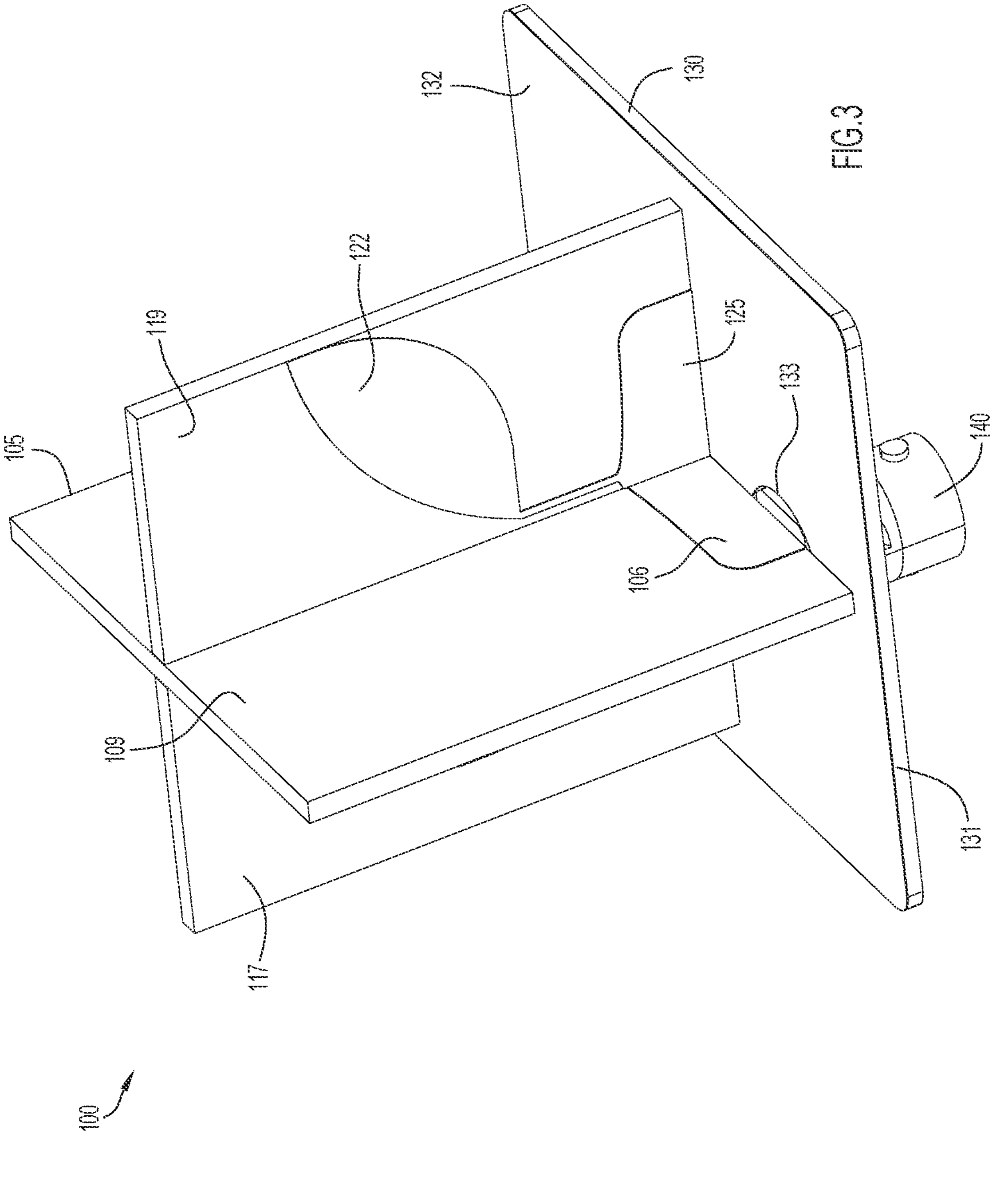
FIG. 3 is a third perspective view of an antenna element constructed according to the disclosed techniques, according to an example embodiment.
Figure 4:
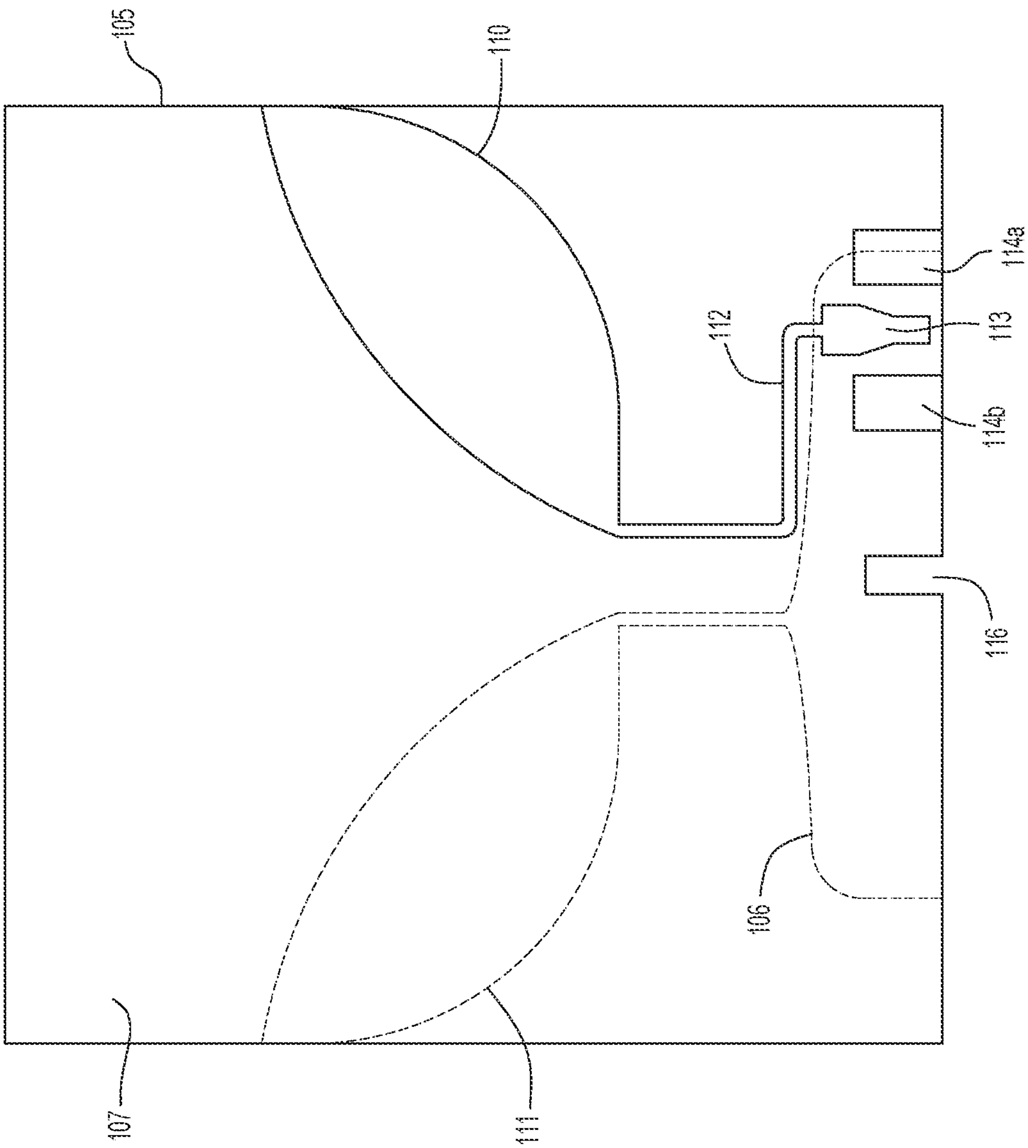
FIG. 4 is a horizontal element of an antenna element constructed according to the disclosed techniques, according to an example embodiment.

With reference made to FIGS. 1-5, depicted therein is an antipodal Vivaldi antenna (AVA) 100 configured according to the techniques disclosed herein. AVA 100 includes a horizontal element 105, a vertical element 117 and a ground plane element 130. As an antipodal Vivaldi antenna, horizontal element 105 includes a first side 107 and a second side 109, illustrated in more detail in FIG. 4. As shown in FIG. 4, a first Vivaldi arm 110 is arranged on first side 107 and a second Vivaldi arm 111 is arranged on the second side 109. The first Vivaldi arm 110 and the second Vivaldi arm 111 are formed as microstrip structures on the copper clad laminate substrate of horizontal element 105. The microstrip structure of first Vivaldi arm 110 includes feed line connection pad 113 which connects feed line 112 to antenna feed pin 141 (illustrated in FIG. 1). Second Vivaldi arm 111 is formed as a microstrip structure on second side 109 of horizontal element 105. Included in second Vivaldi arm 111 is solder pad 106. As will be described in greater detail below, solder pad 106 will be used to solder horizontal element 105 to ground plane element 130. Horizontal element 105 also includes solder pads 114*a* and 114*b* for attaching sub miniature push-on micro (SMPM) connector 140. Horizontal element 105 also includes notch 116 which engages with channel 126 of vertical element 117 (illustrated in FIG. 5).

Figure 5:
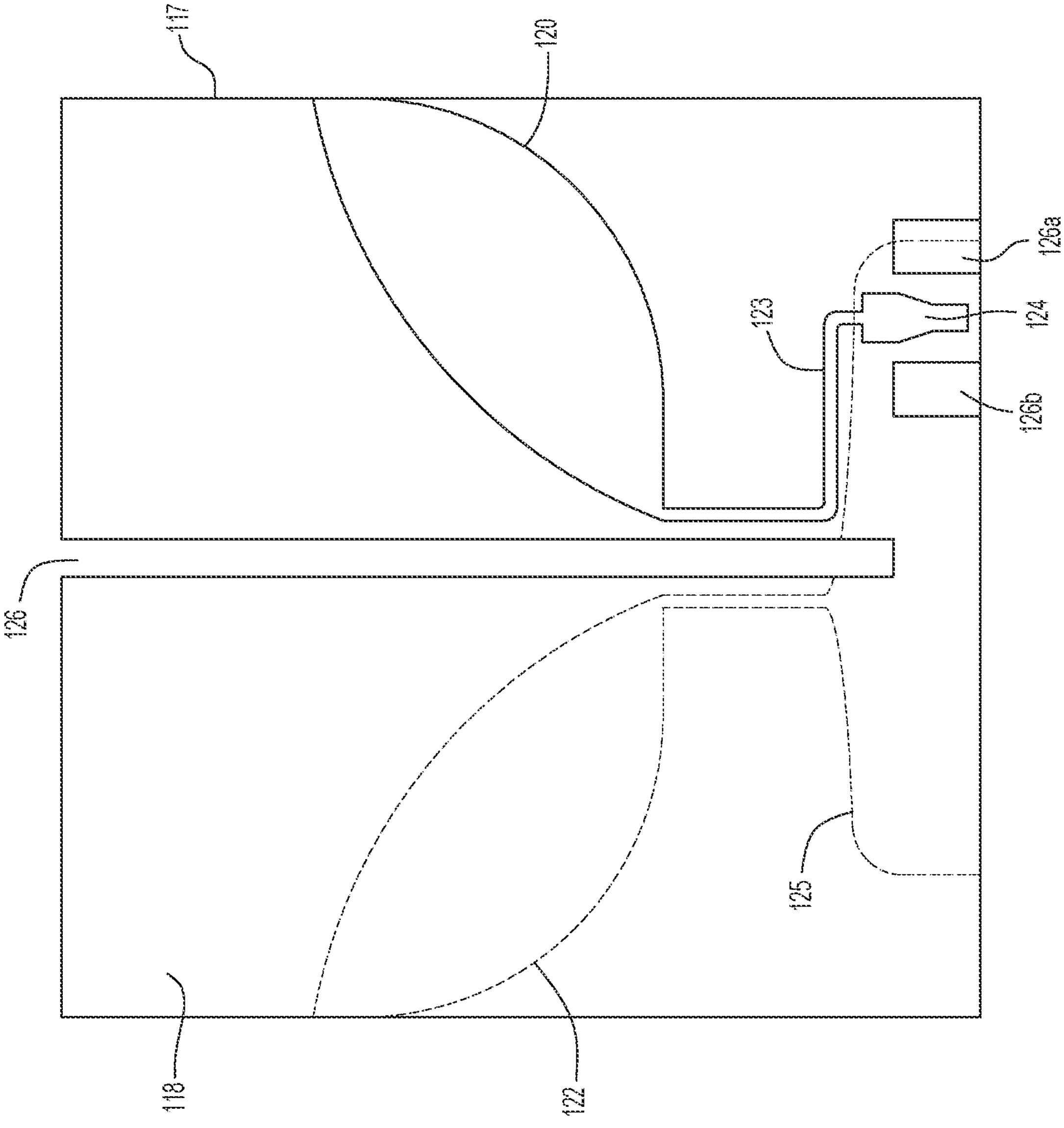
FIG. 5 is a vertical element of an antenna element constructed according to the disclosed techniques, according to an example embodiment.

Turning to vertical element 117 (illustrated in detail in FIG. 5), vertical element 117 includes a similar microstrip structure as that of horizontal element 105. Vertical element 117 includes a first side 118 and a second side 119. As shown in FIG. 5, a first vertical Vivaldi arm 120 is arranged on first side 118 and a second vertical Vivaldi arm 122 is arranged on the second side 119. The first vertical Vivaldi arm 120 and the second vertical Vivaldi arm 122 are formed as microstrip structures on the copper clad laminate substrate of vertical element 117. The microstrip structure of first vertical Vivaldi arm 120 includes feed line connection pad 124 which connects feed line 123 to antenna feed pin 143 (illustrated in FIG. 1). Second vertical Vivaldi arm 122 is formed as a microstrip structure on second side 119 of vertical element 117. Included in second vertical Vivaldi arm 122 is solder pad 125. As will be described in greater detail below, solder pad 125 will be used to solder vertical element 117 to ground plane element 130. Vertical element 117 includes solder pads 126*a* and 126*b* for attaching SMPM connector 142. As noted above, vertical element 117 also includes channel 126 which engages with notch 116 of horizontal element 105 (illustrated in FIG. 4).

Figure 1:
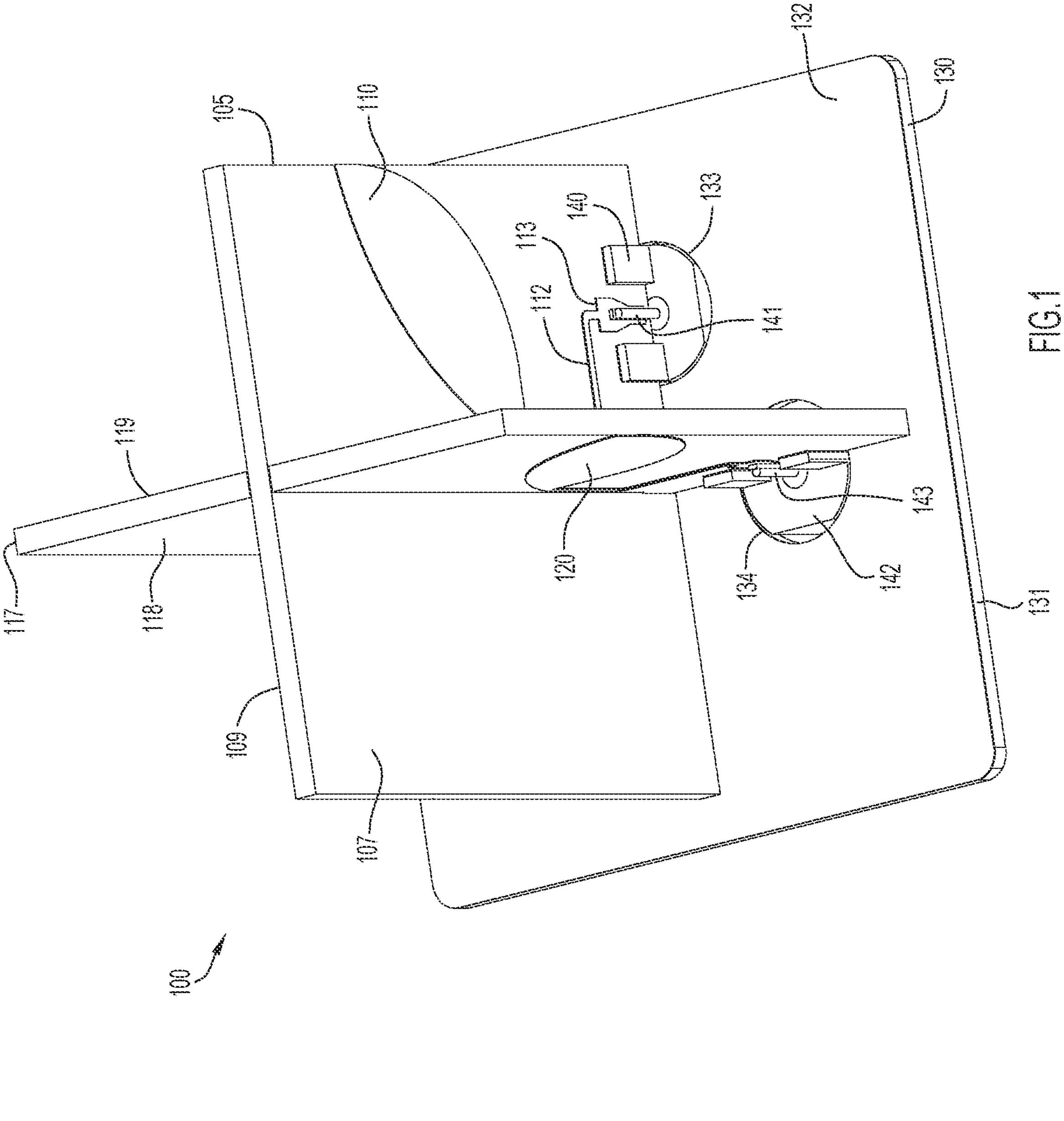
FIG. 1 is a first perspective view of an antenna element constructed according to the techniques disclosed herein, according to an example embodiment.

Horizontal element 105 and vertical element 117 are arranged on ground plane element 130, as illustrated in FIGS. 1-3. According to the techniques disclosed herein, ground plane element 130 is formed from a combination of a non-conductive support layer 131 and a conductive layer 132. According to the specific example embodiment of FIGS. 1-3, ground plane element 130 is formed from a laminate of copper (serving as the conductive layer 132) and a dielectric or insulating material (serving as the non-conductive support layer 131) which are laminated together to form a copper laminate material. According to a specific example, the copper laminate material may be constructed from a printed circuit board (PCB) material, in which the copper foil serves as the conductive layer 132 and the PCB core serves as the non-conductive support layer. Ground plane element 130 may include additional materials, such as a PCB prepreg layer.

According to another example, the conductive layer 132 may be constructed from a spun metal layer, and the non-conductive support layer 131 may be constructed from a polyimide material. As understood by the skilled artisan, polyimide materials are polymers containing imide groups belonging to the class of high-performance plastics, such as those used in power electronics found in high speed switch devices.

As understood from the example materials described above, conductive layer 132 may be formed from a thin conductive layer, such as a copper or other metallic foil or a thin spun metal layer. The use of such materials for ground plane element 130 enables AVA 100 to have a lightweight design while retaining desirable performance characteristics. Specifically, ground plane element 130 may provide a lightweight ground plane with strong radio frequency (RF) performance. Typical related art Vivaldi antennas rely on heavy aluminum mechanical structures to achieve similar RF performance. Accordingly, AVA 100 maintains similar RF performance with significantly lighter weight mechanical structures.

Ground plane element 130 includes two orifices-orifice 133 and orifice 134. Orifice 133 allows SMPM connector 140 to pass through ground plane element 130 and connects antenna feed pin 141 to feed line connection pad 113. Orifice 134 allows SMPM connector 142 to pass through ground plane element 130 and connects antenna feed pin 143 to feed line connection pad 124.

Figure 6:
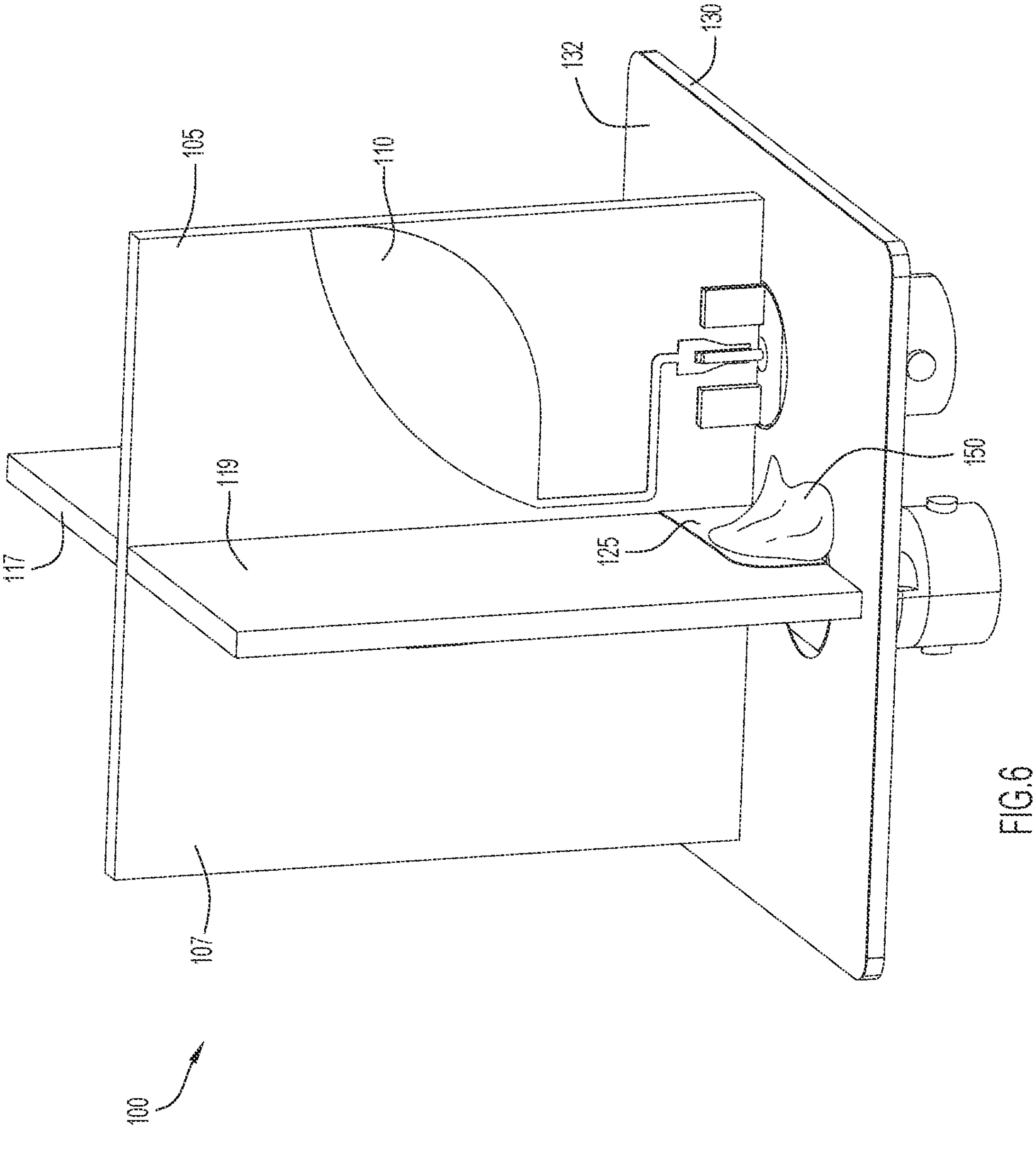
FIG. 6 illustrates the use of solder in constructing an antenna element according to the disclosed techniques, according to an example embodiment.

To secure horizontal element 105 to ground plane element 130, solder pad 106 is soldered to conductive layer 132. Similarly, vertical element 117 is secured to substrate 130 by soldering solder pad 125 to conductive layer 132. The use of solder 150 to connect vertical element 117 to conductive layer 132 is illustrated in FIG. 6. While obscured in FIG. 6 by horizontal element 105, horizontal element 105 is similarly secured to ground plane element 130 via solder between solder pad 106 and conductive layer 132.

Figure 7:
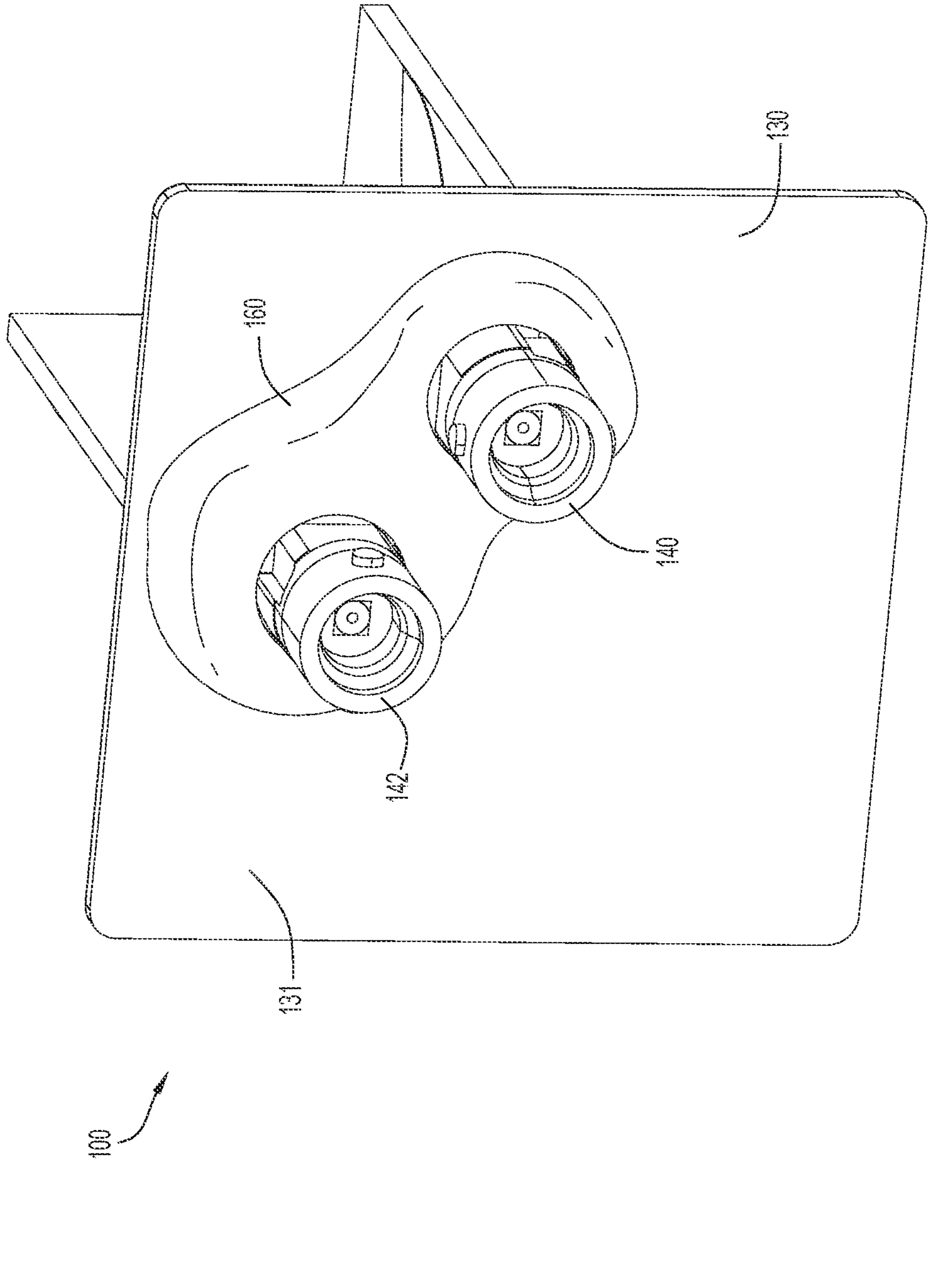
FIG. 7 illustrates the use of epoxy in constructing an antenna element according to the disclosed techniques, according to an example embodiment.

Further structural integrity is provided to AVA 100 by epoxying SMPM connectors 140 and 142 to non-conductive support layer 131 of ground plane element 130, as illustrated in FIG. 7. As illustrated in FIG. 7, epoxy 160 secures SMPM connectors 140 and 142 to non-conductive support layer 131. The combination of solder 150 (illustrated in FIG. 6) and epoxy 160 (illustrated in FIG. 7) provide for a structurally sound antenna structure that is simple to construct, easy to integrate into, for example, antenna arrays, and that is easily scalable to operate at the L (1-2 GHZ), S (2-4 GHZ), C (4-8 GHZ), X (8-12 GHz), Ku (12-18 GHz), K (18-27 GHZ) and Ka (27-40 GHz) frequency bands.

Based upon the feeding provided by SMPM connector 140 and SMPM connector 142, AVA 100 may radiate linear horizontal polarization by feeding only SMPM connector 140, radiate linear vertical polarization by feeding only SMPM connector 142, and radiate dual-circular polarization by connecting to a 90° hybrid coupler to provide a 90° phase shift between SMPM connector 140 and SMPM connector 142.

Figure 8:
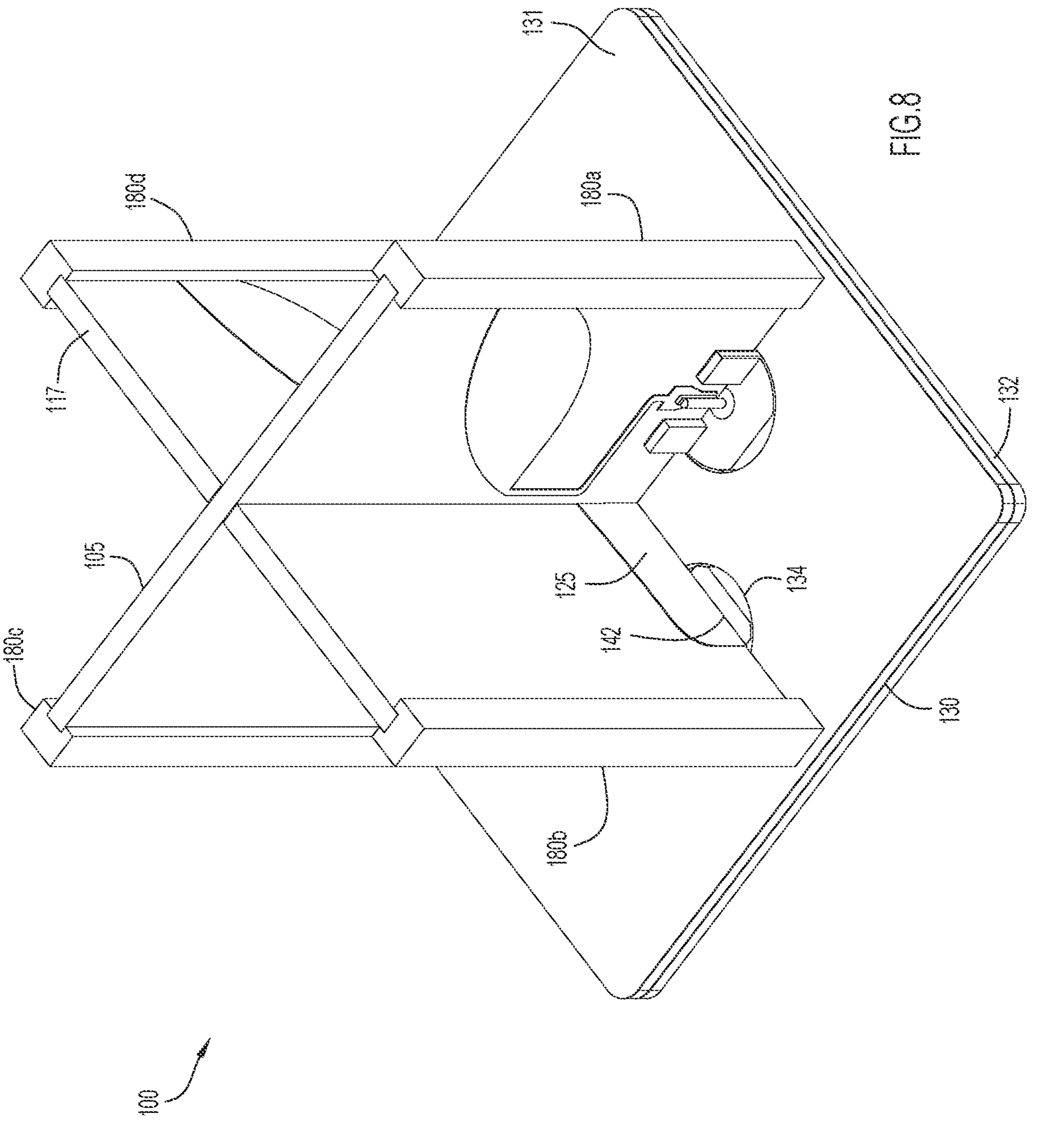
FIG. 8 is a first perspective view of an antenna element that includes support structures according to the disclosed techniques, according to an example embodiment.
Figure 9:
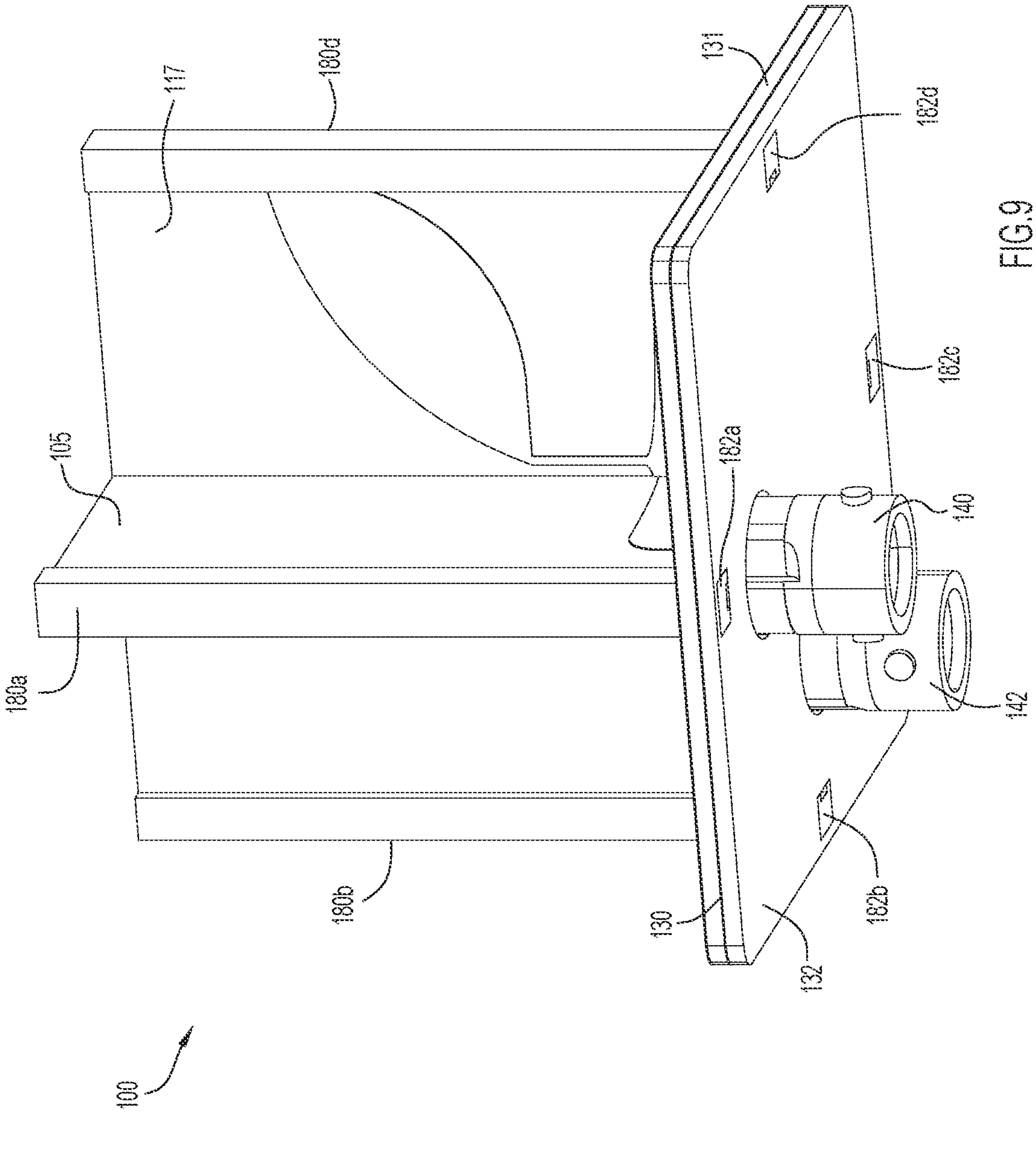
FIG. 9 is a second perspective view of an antenna element that includes support structures according to the disclosed techniques, according to an example embodiment.

As discussed above, the combination of solder 150 (illustrated in FIG. 6) and epoxy 160 (illustrated in FIG. 7) provide for a structurally sound antenna structure. However, if additional structural integrity is required or beneficial to a particular application, additional support structures may be included in AVA 100, as illustrated in FIGS. 8 and 9. As shown in FIGS. 8 and 9, support structures 180*a-d* may be included in AVA 100. Support structures 180*a* and 180*c* may be provided with a "U" shape cross-section to engage with the ends of horizontal element 105. Similarly, support structures 180*b* and 180*d* are configured to engage with the ends of vertical element 117. As illustrated in FIG. 9, ground plane element 130 includes orifices 182*a-d* formed in non-conductive support layer 131 and conductive layer 132 to engage and secure support structures 180*a-d*. Orifices

180*a-d* may be sized such that they secure support structures 180*a-d*via a friction fit. According to other example embodiments support structures 180*a-d* may be secured in orifices 182*a-d* via gluing, epoxying, sonic welding, or techniques known to the skilled artisan.

FIGS. 8 and 9 also differ from the embodiment of FIGS. 1-5 in that the orientation of non-conductive support layer 131 and conductive layer 132 is reversed. Specifically, non-conductive support layer 131 is on the same side of the ground plane element 130 as horizontal element 105 and the vertical element 117. Accordingly, the embodiment of FIGS. 8 and 9 illustrates an alternative method of mounting horizontal element 105 and the vertical element 117 to ground plane element 130. According to this embodiment, solder pad 125 would be soldered to the portion of connector 142 exposed by orifice 134. Connector 142 would then be soldered to conductive layer 132 on the opposite side of ground plane element 130 electrically and mechanically connecting vertical element 117 to ground plane element 130. Connector 140 would be analogously soldered to horizontal element 105 and conductive layer 132 to electrically and mechanically connect horizontal element 105 to ground plane element 130. This reversed ground plane element 130 may be applied to the structure illustrated in FIGS. 1-7 (i.e., the embodiment without support structures 180*a-d* and orifices 182*a-d*) without deviating the antenna construction techniques disclosed herein.

Figure 10:
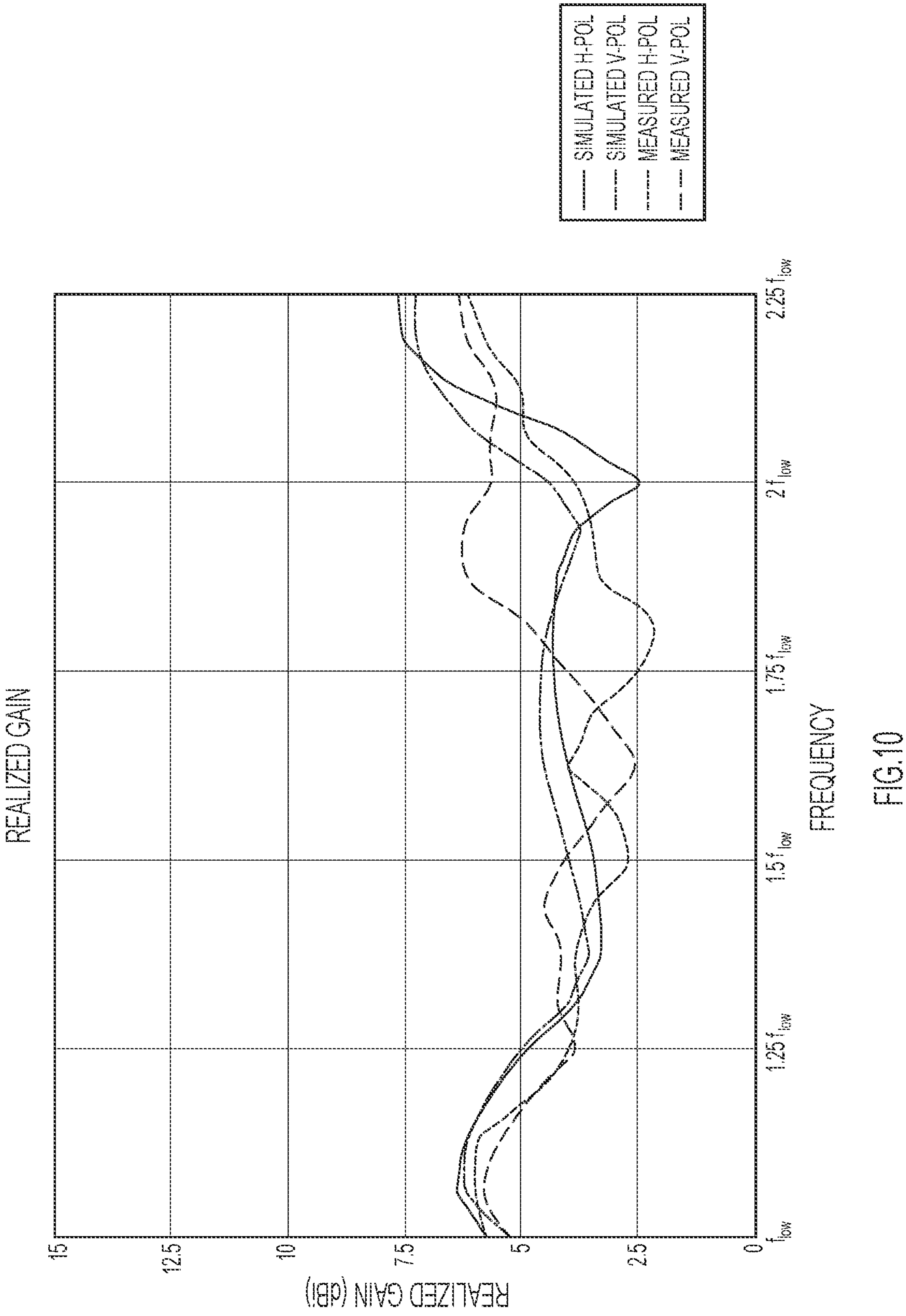
FIG. 10 is a graph comparing measured and simulated realized gain for an antenna element constructed according to the disclosed techniques, according to an example embodiment.
Figure 11:
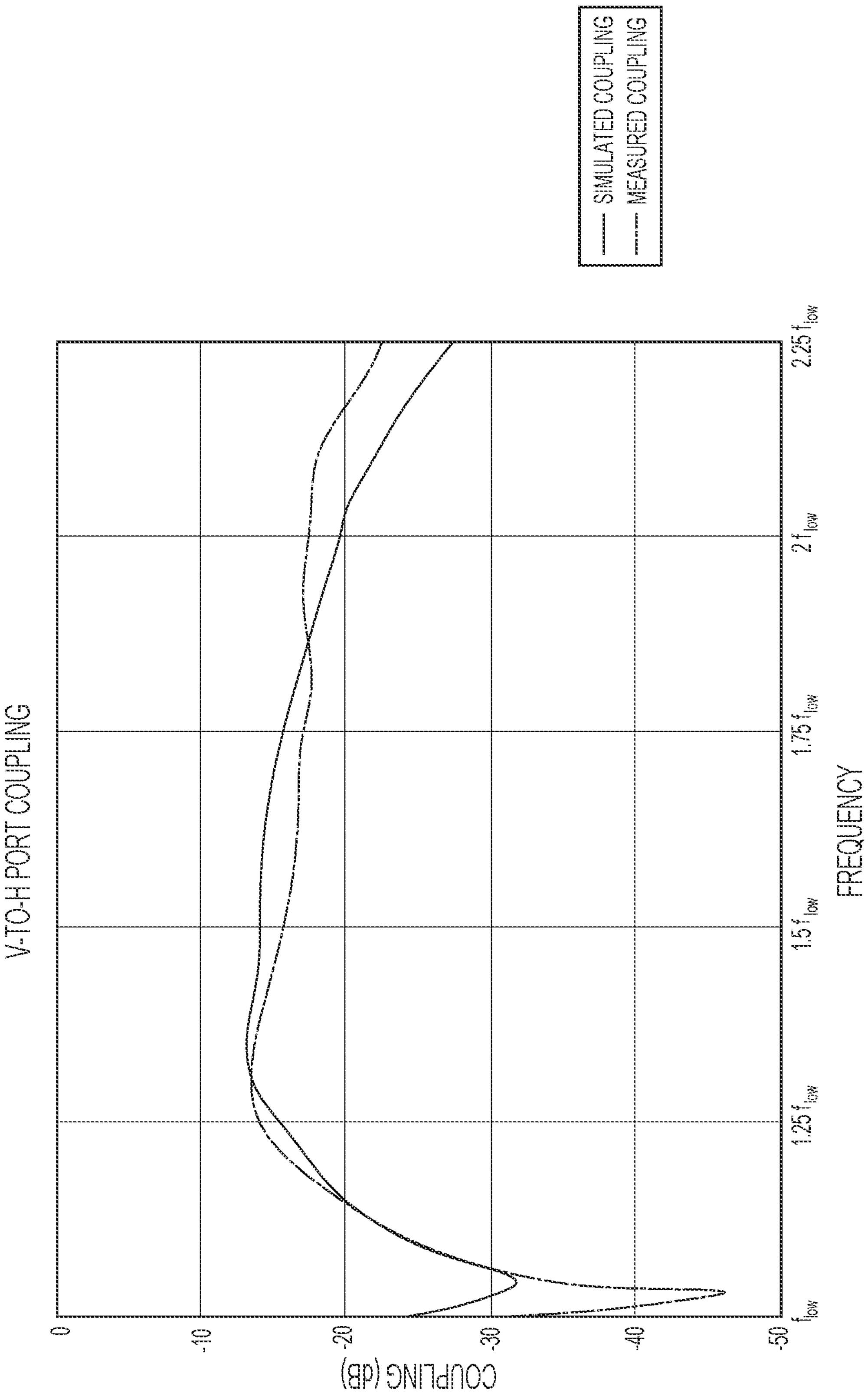
FIG. 11 is a graph comparing measured and simulated vertical to horizontal port coupling for an antenna element constructed according to the disclosed techniques, according to an example embodiment.
Figure 12:
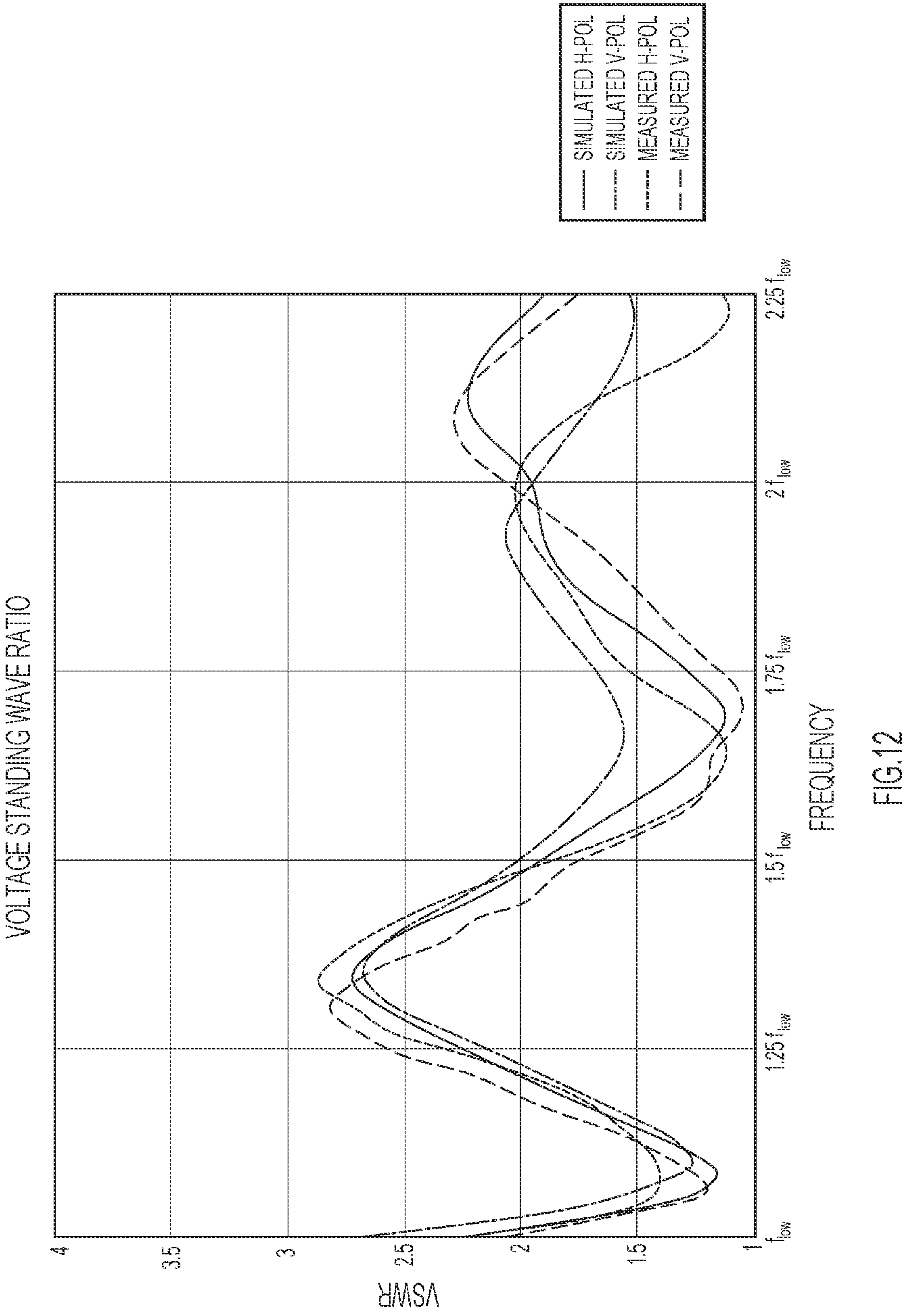
FIG. 12 is a graph comparing measured and simulated voltage standing wave ratio (VSWR) for an antenna element constructed according to the disclosed techniques, according to an example embodiment.
Figure 13A:
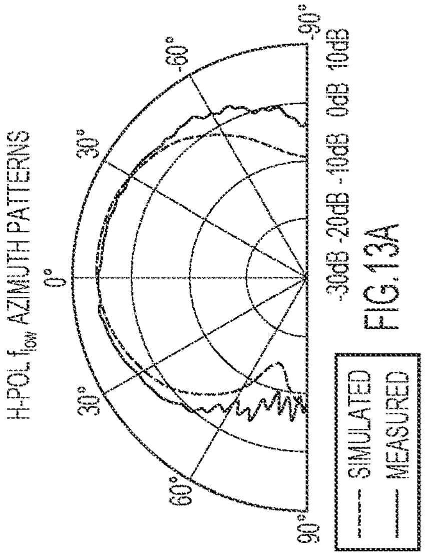
FIGS. 13*a-f* contain graphs comparing measured and simulated horizontal radiation patterns for an antenna element constructed according to the disclosed techniques, according to an example embodiment.
Figure 13B:
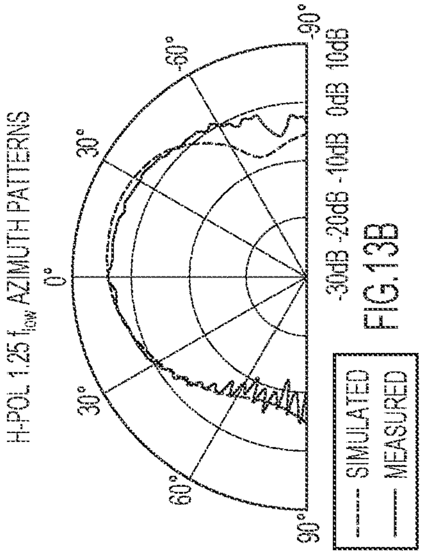
Figure 13C:
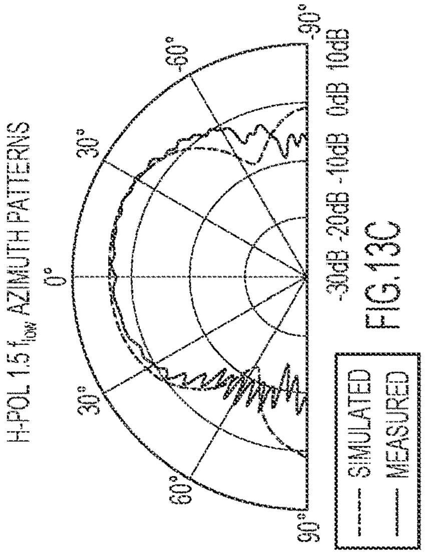
Figure 13D:
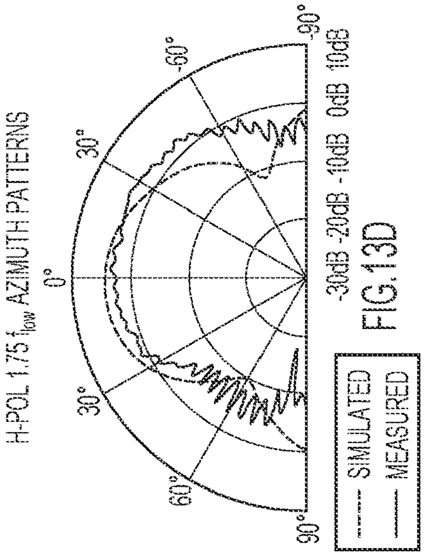
Figure 13E:
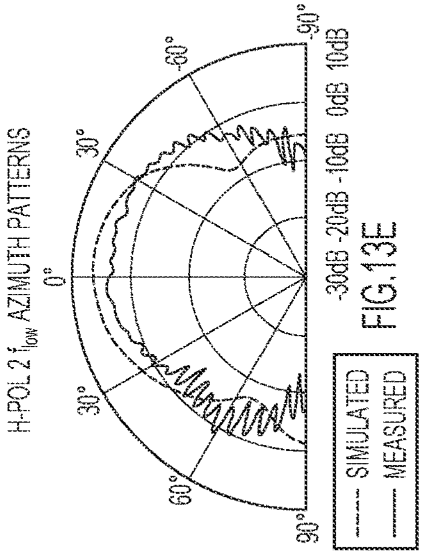
Figure 13F:
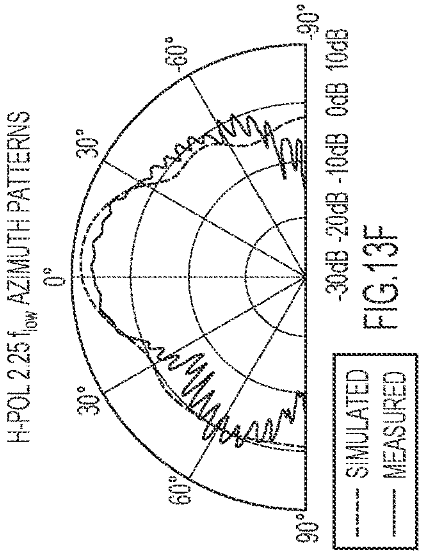
Figure 14A:
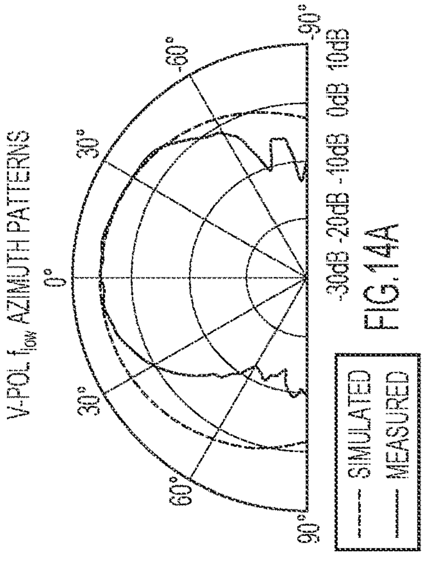
FIGS. 14*a-f* contain graphs comparing measured and simulated vertical radiation patterns for an antenna element constructed according to the disclosed techniques, according to an example embodiment.
Figure 14B:
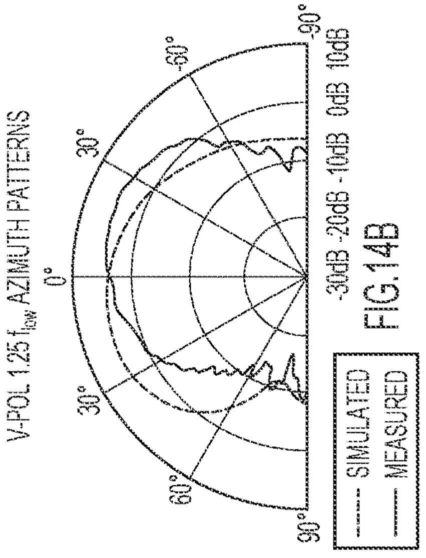
Figure 14C:
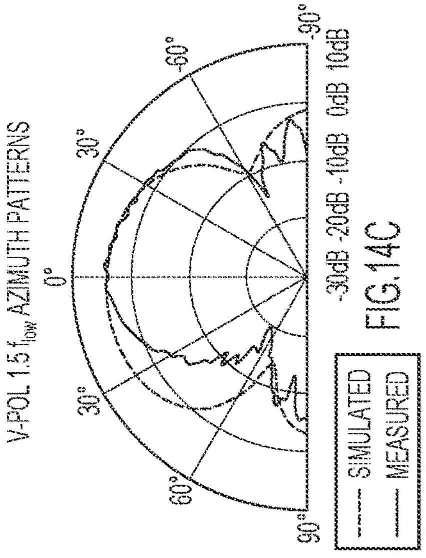
Figure 14D:
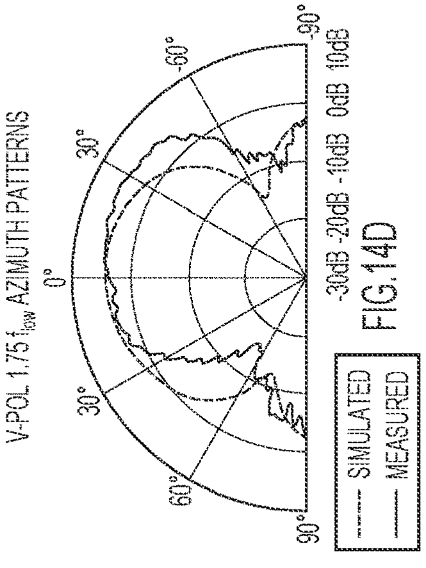
Figure 14E:
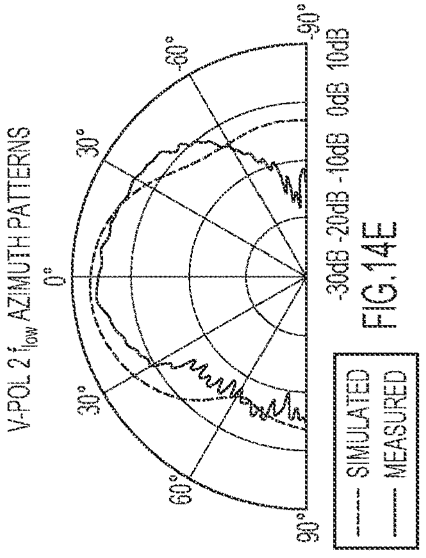
Figure 14F:
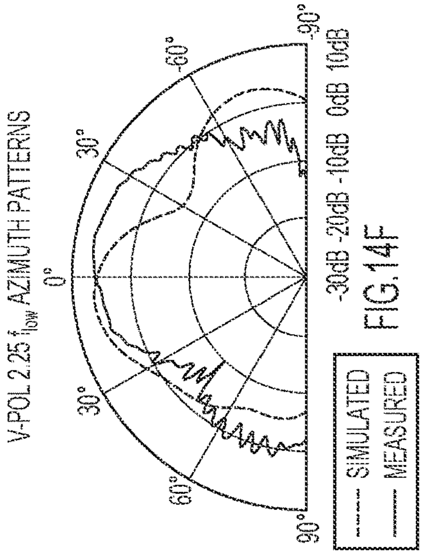

In addition to the structural benefits discussed above, antennas constructed according to the disclosed techniques also exhibit beneficial electrical properties. For example, illustrated in FIG. 10 is a comparison of the realized gain of an AVA constructed according to the disclosed techniques compared to the simulated values. Specifically, FIG. 10 compares the simulated and measured realized gain for both horizontal and vertical polarized operation of the antenna element. FIG. 11 provides a graph comparing the measured versus simulated vertical-to-horizontal port coupling of the AVA. FIG. 12 provides a graph comparing the measured versus simulated voltage standing wave ratio for both horizontal and vertical polarized operation of the AVA. As illustrated in these graphs, the AVA element not only exhibits strong electrical performance, but its measured performance substantially matches its simulated performance. This agreement between the measure and simulated performance evidences the success of the disclosed techniques. Because the measured performance substantially matches the simulated performance, the techniques may be confidently applied when designing new antenna structures knowing the resulting physical antenna will behave as expected.

The disclosed techniques also provide for radiation patterns that are not only applicable to many different applications, but that also match their simulated performance. Illustrated in FIGS. 13*a-f* are comparisons of the measured horizontal radiation pattern for an AVA constructed according to the disclosed techniques compared with the simulated pattern for the same structure, across an operating frequency range of the antenna. Not only are the radiation patterns fairly hemispherical, but the measured patterns substantially match the simulation patterns. FIGS. 14*a-f* illustrate comparisons of the measured vertical radiation pattern for an AVA constructed according to the disclosed techniques compared with the simulated pattern for the same structure across the operating frequency range of the antenna. As with the horizontal radiation patterns of FIGS. 13*a-f*, the vertical radiation patterns of FIGS. 14*a-f* are fairly hemispherical and substantially match the simulation patterns.

In summary, provided for herein are techniques for providing an antenna and antenna structure that has a simple and light-weight construction. The disclosed techniques also provide for antennas that exhibit desirable gain, radiation patterns, and S-parameters in a small package. Furthermore, testing of antennas constructed according to the disclosed techniques exhibit performance that closely measures their simulated performance, indicating a successful and repeatable antenna design. Given the lightweight and high gain performance achievable through the disclosed techniques, the techniques may be particularly applicable to airborne applications, including satellite low earth orbit applications. When the disclosed techniques are leveraged to implement AVA elements, the techniques may be particularly applicable to airborne telemetry applications.

Figure 15:
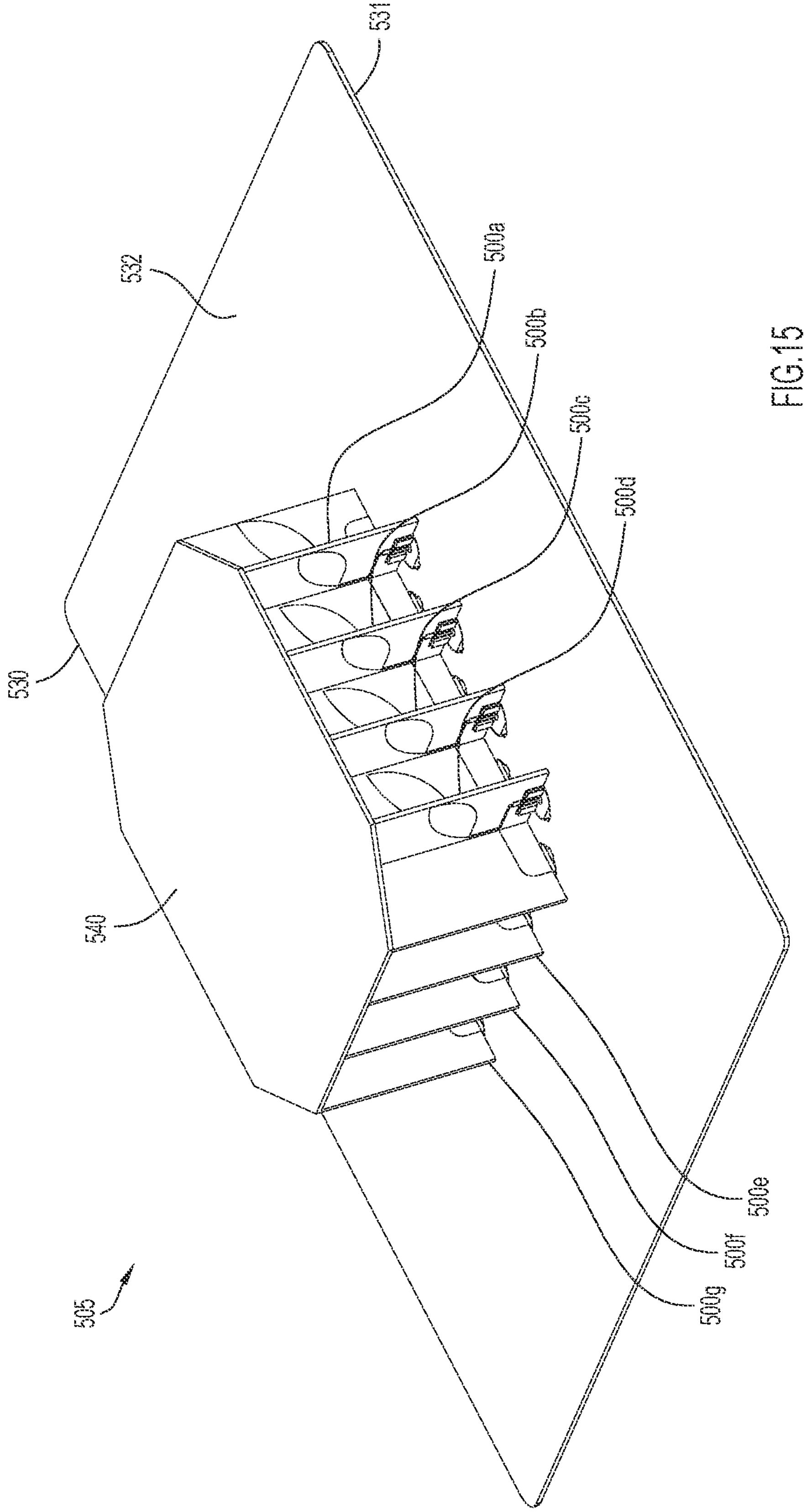
FIG. 15 is a perspective view of an antenna array constructed according to the techniques disclosed herein, according to an example embodiment.

The techniques of this disclosure are not limited to antenna elements. Instead, as illustrated in FIG. 15, the disclosed techniques may be applied to antenna arrays. Specifically, illustrated in FIG. 15 are a number of AVA antenna elements 500*a-g* that have been arranged into antenna array 505. While only seven AVA antenna elements 500*a-g* are visible, antenna array 505 is 4×4 array that includes 16 AVA antenna elements. Each of antenna elements 500*a-g* is constructed substantially the same as AVA 100 of FIGS. 1-7. However, antenna array 505 includes a single ground plane element 530. Like ground plane element 130, ground plane element 530 is constructed from non-conductive support layer 531 and a conductive layer 532. Accordingly, ground plane element 530 may be formed from a laminate of copper (serving as the conductive layer 532) and a non-conductive material (serving as the non-conductive support layer 531) which are laminated together to form a copper laminate material. Non-conductive support layer 531 provides a light substrate that supports AVA antenna elements 500*a-g*, while conductive layer 532 exhibits the necessary electrical properties so that ground plane element 530 serves as an effective ground plane for antenna array 505. Antenna array 505 may also include a cover 540 which serves to protect and add structural rigidity to antenna array 505. Cover 540 is configured to be essentially transparent to the radiation frequencies that are sent or received by antenna elements 500*a-g* so as to not negatively affect the performance of antenna array 505. For example, cover 540 may be constructed from a closed cell foam. A closed cell foam layer may also be added to ground plane element 130 provide additional structural support and/or rigidity to antenna array 505.

The above description of AVA 100 and antenna array 505 has been provided with regard to an example embodiment in which the radiating elements are embodied as Vivaldi elements, and in particular AVA elements. However, the techniques described herein may be applied to other types of antenna elements, including vertical tightly coupled dipole antenna elements and arrays, Planar Ultrawideband Modular Antenna (PUMA) element and arrays, and Stacked Patch elements and arrays. As understood by the skilled artisan from the present disclosure, the disclosed techniques may be implementing in conjunction with any number of different antenna elements to significantly reduce the weight, design complexity, cost, and schedule for designing and constructing antenna elements and arrays.

In summary, the techniques described herein relate to an apparatus including: a ground plane element including: a non-conductive support layer, a conductive layer arranged on the non-conductive support layer, and at least one orifice through the non-conductive support layer and the conductive layer; one or more radiating elements including a feed line and a solder pad, wherein each of the one or more radiating elements is secured to and electrically connected to the ground plane element via soldering of the solder pad to the conductive layer; and at least one connector arranged in the at least one orifice and electrically connected to the feed line.

In some aspects, the techniques described herein relate to an apparatus, wherein the one or more radiating elements includes a Vivaldi radiating element.

In some aspects, the techniques described herein relate to an apparatus, wherein the Vivaldi radiating element includes an antipodal Vivaldi radiating element.

In some aspects, the techniques described herein relate to an apparatus, wherein the one or more radiating elements include a first Vivaldi radiating element and a second Vivaldi radiating element arranged orthogonally and concentrically to each other.

In some aspects, the techniques described herein relate to an apparatus, wherein the first Vivaldi radiating element is configured to transmit or receive radiation with a first linear polarization; and wherein the second Vivaldi radiating element is configured to transmit or receive radiation with a second linear polarization orthogonal to the first linear polarization.

In some aspects, the techniques described herein relate to an apparatus, wherein the first Vivaldi radiating element and the second Vivaldi radiating element are configured to transmit or receive radiation with circular polarization.

In some aspects, the techniques described herein relate to an apparatus, wherein the conductive layer includes a copper conductive laminate layer.

In some aspects, the techniques described herein relate to an apparatus, wherein the non-conductive support layer and the conductive layer include a copper clad laminate material.

In some aspects, the techniques described herein relate to an apparatus, wherein the at least one connector is epoxied to the ground plane element.

In some aspects, the techniques described herein relate to an apparatus, further including a support structure secured within a second orifice in the ground plane element and supporting an edge of the one or more radiating elements.

In some aspects, the techniques described herein relate to an apparatus, wherein the one or more radiating elements includes a microstrip structure on a copper clad laminate substrate.

In some aspects, the techniques described herein relate to an apparatus, wherein the solder pad includes a microstrip structure on a copper clad laminate substrate.

In some aspects, the techniques described herein relate to an apparatus including: a ground plane element including: a non-conductive support layer, a conductive layer arranged on the non-conductive support layer, and a plurality of orifices through the non-conductive support layer, and the conductive layer; a plurality of antenna elements arranged on the ground plane element, wherein each of the plurality of antenna elements includes a feed line and a solder pad, and wherein each of the plurality of antenna elements is secured to and electrically connected to the ground plane element via soldering of its respective solder pad to the conductive layer; and a plurality of connectors, wherein each of the plurality of connectors is arranged in a respective one of the plurality of orifices and electrically connected to a respective one of the feed lines.

In some aspects, the techniques described herein relate to an apparatus, wherein each of the plurality of antenna elements includes a Vivaldi antenna element.

In some aspects, the techniques described herein relate to an apparatus, wherein each of the plurality of antenna elements includes an antipodal Vivaldi antenna element.

In some aspects, the techniques described herein relate to an apparatus, wherein the conductive layer includes a copper laminate layer.

In some aspects, the techniques described herein relate to an apparatus, wherein each of the plurality of connectors is epoxied to the non-conductive support layer.

In some aspects, the techniques described herein relate to an apparatus, further including a cover arranged on the plurality antenna elements opposite to the ground plane element.

In some aspects, the techniques described herein relate to an apparatus, wherein the cover is transparent to radiation sent or received by the plurality of antenna elements.

In some aspects, the techniques described herein relate to an apparatus, wherein the cover includes a closed cell foam.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
- a ground plane element comprising:
  - a non-conductive support layer,
  - a conductive layer arranged on the non-conductive support layer, and
  - a first orifice through the non-conductive support layer and the conductive layer, and
  - a second orifice through the non-conductive support layer and the conductive layer;
- a first Vivaldi radiating element comprising a first feed line and a first solder pad, wherein the first Vivaldi radiating element is electrically connected to the ground plane element via first soldering of the first solder pad to the conductive layer;
- a second Vivaldi radiating element comprising a second feed line and a second solder pad, wherein the second Vivaldi radiating element is electrically connected to the ground plane element via second soldering of the second solder pad to the conductive layer, wherein the second Vivaldi radiating element is arranged orthogonally and concentrically relative to the first Vivaldi radiating element;
- a first connector arranged in the first orifice and electrically connected to the first feed line;
- a second connector arranged in the second orifice and electrically connected to the second feed line;
- first epoxy epoxying the first connector to the non-conductive support layer; and
- second epoxy epoxying the second connector to the non-conductive support layer,
- wherein the first soldering and first epoxy secure the first Vivaldi radiating element to the non-conductive support layer and the second soldering and second epoxy secure the second Vivaldi radiating element to the non-conductive support layer without further structural supports.

2. The apparatus of claim 1, wherein the first Vivaldi radiating element comprises a first antipodal Vivaldi radiating element and the second Vivaldi radiating element comprises a second antipodal Vivaldi radiating element.

3. The apparatus of claim 1, wherein the first Vivaldi radiating element is configured to transmit or receive radiation with a first linear polarization; and wherein the second Vivaldi radiating element is configured to transmit or receive radiation with a second linear polarization orthogonal to the first linear polarization.

4. The apparatus of claim 1, wherein the first Vivaldi radiating element and the second Vivaldi radiating element are configured to transmit or receive radiation with circular polarization.

5. The apparatus of claim 1, wherein the conductive layer comprises a copper conductive laminate layer.

6. The apparatus of claim 1, wherein the non-conductive support layer and the conductive layer comprise a copper clad laminate material.

7. The apparatus of claim 1, wherein the first connector is epoxied to the ground plane element and the second connector is epoxied to the ground plane element.

8. The apparatus of claim 1, further comprising a support structure secured within a third orifice in the ground plane element and supporting an edge of the first Vivaldi radiating element or the second Vivaldi radiating element.

9. The apparatus of claim 1, wherein the first Vivaldi radiating element comprises a microstrip structure on a copper clad laminate substrate.

10. The apparatus of claim 1, wherein the first solder pad comprises a microstrip structure on a copper clad laminate substrate.

11. An apparatus comprising:

a ground plane element comprising:

a non-conductive support layer, a conductive layer arranged on the non-conductive support layer, and a plurality of orifices through the non-conductive support layer, and the conductive layer;

a plurality of pairs of Vivaldi antenna elements arranged on the ground plane element, wherein each Vivaldi element of the plurality of pairs of Vivaldi antenna elements comprises a feed line and a solder pad, wherein each Vivaldi element of the plurality of pairs of Vivaldi antenna elements is secured to and electrically connected to the ground plane element via soldering of its respective solder pad to the conductive layer, and wherein the Vivaldi antenna elements of each of the plurality of pairs of Vivaldi antenna elements are arranged orthogonally and concentrically relative to each other; and a plurality of connectors, wherein each of the plurality of connectors is arranged in a respective one of the plurality of orifices, is electrically connected to a respective one of the feed lines, and epoxy secures each of the plurality of connectors to the non-conductive support layer, wherein the soldering and the epoxy secure the plurality of pairs of Vivaldi radiating element to the non-conductive support layer without further structural supports.

12. The apparatus of claim 11, wherein each of the pairs of Vivaldi antenna elements of the plurality of pairs of Vivaldi antenna elements comprises a pair of antipodal Vivaldi antenna elements.

13. The apparatus of claim 11, wherein the conductive layer comprises a copper laminate layer.

14. The apparatus of claim 11, wherein each of the plurality of connectors is epoxied to the non-conductive support layer.

15. The apparatus of claim 11, further comprising a cover arranged on the plurality pairs of Vivaldi antenna elements opposite to the ground plane element.

16. The apparatus of claim 15, wherein the cover is transparent to radiation sent or received by the plurality of antenna elements.

17. The apparatus of claim 15, wherein the cover comprises a closed cell foam.

18. The apparatus of claim 11, wherein each of the plurality of pairs of Vivaldi antenna elements comprises a first Vivaldi antenna element configured to transmit or receive radiation with a first linear polarization.

19. The apparatus of claim 18, wherein each of the plurality of pairs of Vivaldi antenna elements comprises a second Vivaldi antenna element configured to transmit or receive radiation with a second linear polarization orthogonal to the first linear polarization.

20. The apparatus of claim 11, wherein each of the plurality of pairs of Vivaldi antenna elements is configured to transmit or receive radiation with circular polarization.

* * * * *